United States Patent [19]

Tanaka et al.

[11] 4,434,503

[45] Feb. 28, 1984

[54] IMAGE INFORMATION OUTPUT APPARATUS

[75] Inventors: Atsuyuki Tanaka, Shinshiro; Hiroaki Kojima, Toyokawa; Shozo Kaieda, Toyokawa; Tokuji Kakiuchi, Toyokawa; Nobuaki Nishioka, Toyokawa; Yukio Tadauchi; Hidekazu Nakagami, both of Toyohashi, all of Japan

[73] Assignee: Minolta Camera Kabushiki Kaisha, Osaka, Japan

[21] Appl. No.: 173,497

[22] Filed: Jul. 29, 1980

[30] Foreign Application Priority Data

Jul. 31, 1979 [JP] Japan .................. 54-98005

[51] Int. Cl.³ .................. G09G 1/16; G06K 9/00
[52] U.S. Cl. .................. 382/48; 340/723; 340/750; 340/798; 364/518
[58] Field of Search .......... 355/7, 14 C, 40; 358/296, 183, 230, 244, 287, 294, 22, 118; 346/134, 136; 340/146.3 H, 146.3 Q, 146.3 R, 146.3 AH, 703, 709, 723, 725, 730, 734, 735, 796, 799; 364/518–523; 382/48

[56] References Cited

U.S. PATENT DOCUMENTS

| | | | |
|---|---|---|---|
| 3,700,324 | 10/1972 | Hutner et al. | 355/7 |
| 4,007,362 | 2/1977 | Sindermann | 364/518 |
| 4,101,879 | 7/1978 | Kawaji et al. | 340/709 |
| 4,121,283 | 10/1978 | Walker | 340/709 |
| 4,148,062 | 4/1979 | Kamin | 340/146.3 Q |
| 4,189,744 | 2/1980 | Stern | 340/725 |
| 4,303,332 | 12/1981 | Sakai | 355/7 |
| 4,322,157 | 3/1982 | Miura et al. | 355/7 |
| 4,325,086 | 4/1982 | Sato et al. | 340/146.3 H |
| 4,380,025 | 4/1983 | Deane | 358/183 |

FOREIGN PATENT DOCUMENTS

54-21842 2/1979 Japan .

Primary Examiner—Leo H. Boudreau
Attorney, Agent, or Firm—Wenderoth, Lind & Ponack

[57] ABSTRACT

An image information output apparatus which includes a circuit for setting conditions for a "0" or a "1" level in an X direction, a circuit for setting conditions for a "0" or a "1" level in a Y direction with respect to each of respective image units over an entire output image plane divided into an X-Y matrix configuration, a circuit for generating an output timing signal for each of the image units, an AND circuit for ANDing two signals so as to output conditional signals at every generation of the output timing signal for each of the image units, one conditional signal being related to the X direction condition setting and one conditional signal related to the Y direction condition setting, a circuit for storing image information, and a circuit for outputting the stored image information, one image unit by one image unit, for each "1" level output signal of the AND circuit.

5 Claims, 10 Drawing Figures

IMAGE INFORMATION OUTPUT APPARATUS

BACKGROUND OF THE INVENTION

The present invention generally relates to an output system for image information, and more particularly, to an output apparatus for image information which is arranged so as to obtain image information such as characters, figures, etc. on the whole by decomposing the image information into picture elements in the form of a matrix, and for making predetermined image signals which correspond to the respective picture elements.

Conventionally, there has been known a copying apparatus which is adapted to provide hard copies of desired characters, figures and the like by combining optical images obtained by a CRT (cathode ray tube) or OFT (optical fiber tube), etc., for example, with an electrophotographic copying process or the like. In the known copying apparatus as described above, it is so arranged that optical images are obtained by applying the image information which has been preliminarily stored in a memory means to the output apparatus, while the image of an original which has been decomposed into suitable picture element information by a solid state image pickup element such as a CCD image sensor, etc. is stored or output as electrical signals, with such advantages that the storing and retaining of the image information or electrical processing thereof, etc. are readily effected for utilization in a variety of applications.

However, in the prior art arrangement as described above, the memory means for storing the image information in the form of patterns requires an extremely large memory capacity, if it is intended to store the predetermined binary image element information over an entire region of the recording image area or read-off image area, thus not only complicating the processing of the information, but presenting various problems in the aspect of cost.

Meanwhile, depending on the end uses of the hard copies as mentioned above, the image information, such as characters or the like, is not necessarily required for an entire area of a copy paper sheet, but in many cases, such predetermined information is required to be copied only at specific portions of the copy paper sheet. In such a case, it is extremely uneconomical that for the memory means to be provided with the capacity to cope with the entire area of the copy paper sheet as described above, but conventionally, for making it possible to alter the positions where the image information is required, depending on the applications, it has been considered that a memory capacity which can cope with the whole area of the copy paper sheet is necessary.

With attention directed to the points as described above, there have conventionally been provided or proposed certain arrangements in which the predetermined write information is applied only to necessary portions of the images to be copied. In such conventional arrangements, the general practice is such that, as disclosed, for example, in Japanese Laid Open Patent Application Tokkaisho No. 54-21842, the positions of the area to which the image information should be applied are preliminarily set in a memory means in the form of coordinate data for indicating a starting point and a terminating point in the scanning direction for both an X direction and a Y direction, and counting is effected in a unit of image output for each direction by an X direction counter and a Y direction couter, so as to designate the portion surrounded by the designated coordinate positions as a recording area.

However, in the known practice as described above in which the coordinates of the starting and terminating points in both the X and Y directions are designated, although an area designation, for example, of a simple configuration such as one square shape or the like may be comparatively easily effected, if the number of areas to be designated is increased or the configuration thereof becomes complicated, the amount of coordinate data to be preset is consequently increased considerably, with simultaneous complications thereof, and thus, it becomes impossible to accurately designate the positions depending on the configurations of the areas to be dealt with.

SUMMARY OF THE INVENTION

Accordingly, an essential object of the present invention is to provide an improved image information output apparatus which is capable of effecting the designations of areas to which image signals are applied through simple procedures.

Another important object of the present invention is to provide an improved image information output apparatus of the above described type in which a signal which is indicative of whether or not a gate is opened is employed per each unit of image output as conditions for the image signal to be output.

A further object of the present invention is to provide an improved image information output apparatus of the above described type in which the gate is arranged to be opened when the area designating conditions in both of the X and Y directions per each image output unit have become "1".

A still further object of the present invention is to provide an improved image information output apparatus of the above described type which is simple in construction and accurate in functioning, and can be readily manufactured at a low cost.

In accomplishing these and other objects, according to one preferred embodiment of the present invention, there is provided an image information output apparatus which includes a means for setting conditions for a "0" or "1" level disposed in an X direction, a means for setting conditions for "0" or "1" disposed in a Y direction with respect to each of respective image units over an entire output image plane divided into a matrix configuration, a means for generating an output timing signal for each of the image units, a means for ANDing signals so as to output two conditional signals for every generation of the output timing signal for each of the image units, one conditional signal related to the disposition in the X direction and another conditional signal related to the disposition in the Y direction, a means for storing image information, and a means for outputting said stored image information, one image unit by one image unit, at each "1" signal of said AND means.

By the arrangement according to the present invention as described above, an improved image information output apparatus which can designate the image signal output area in a simple manner, has been advantageously presented, with substantial elimination of the disadvantages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
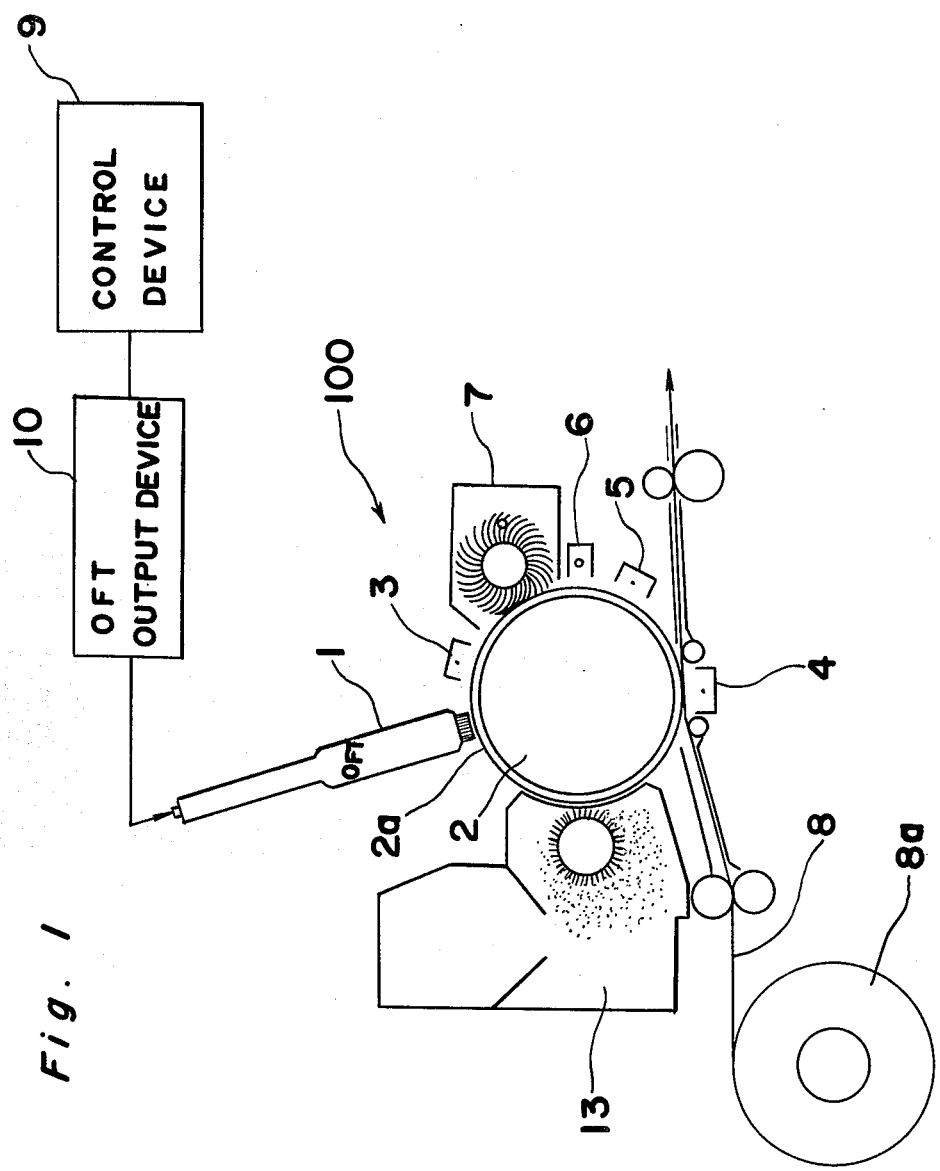
FIG. 1 is a schematic side elevational view showing the general construction of the main portion of a copying apparatus employing an OFT or optical fiber tube as an image exposure means.

Referring now to the drawings, there is schematically shown in FIG. 1 the main portion of an electrophotographic copying apparatus 100 employing an OFT or optical fiber tube 1 used as an output device for image information. In the first place, a copying process will be briefly described hereinbelow with reference to FIG. 1.

In FIG. 1, the copying apparatus 100 generally includes a known photosensitive or photoreceptor drum 2 having a photoreceptor surface 2a formed therearound and rotatably supported at a central portion thereof for rotation in a counterclockwise direction, around which a corona charger 3, the OFT 1, a developing device 13, a transfer charger 4, a charge eraser 5, an eraser lamp 6, a cleaning device 7, etc. are sequentially arranged, so that, as the photoreceptor drum 2 rotates, a visible toner image is copied onto a copy paper 8 fed out from a paper roll 8a and transported at a speed equal to the circumferential speed of the drum 2, successively through the charging of the photoreceptor surface 2a by the corona charger 3, exposure of the photoreceptor surface 2a to light-wise image by the OFT 1 so as to form an electrostatic latent image on the surface 2a, development of the latent image into the visible toner image by the developing device 13, the transfer of the visible toner image onto the copy paper 8 by the transfer charger 4. The copy paper on which the visible toner image is copied in the manner as described above is further wound onto a reel (not shown) or cut off into a required size via a suitable fixing device (not shown) for completion of one copying operation.

In the above arrangement, the output of the OFT 1 is adapted to be produced with the use of proper timing signals which are to be described in greater detail later, so that the exposure to the light-wise image is effected by successively causing it to deviate in a Y direction (i.e. the direction of movement of the photoreceptor surface 2a of the drum 2), the scanning output for each line being arranged in an X direction which is at right angles with the Y direction so as to correspond to the circumferential speed of the photoreceptor drum 2. Meanwhile, since the images obtained by the copying are to be ultimately used in the form of copy paper sheets of predetermined sizes, for example, A4, B5, etc., one pitch for the copying operation is detected in terms of time or distance based on the circumferential speed of the photoreceptor drum 2 (i.e. the feeding speed of the copy paper 8), etc. for synchronization with the image information output. Moreover, in the case where copied images, for example, of character information, are to be obtained by the OFT 1 which functions by the signals produced by a control device 9 including a character generating section (mentioned later), etc. and coupled to the OFT 1 through an OFT output device 10, the timing of the above signal output is so controlled that the output is applied within the area to be set by an area control section 300 to be described with reference to FIG. 2.

Figure 2:
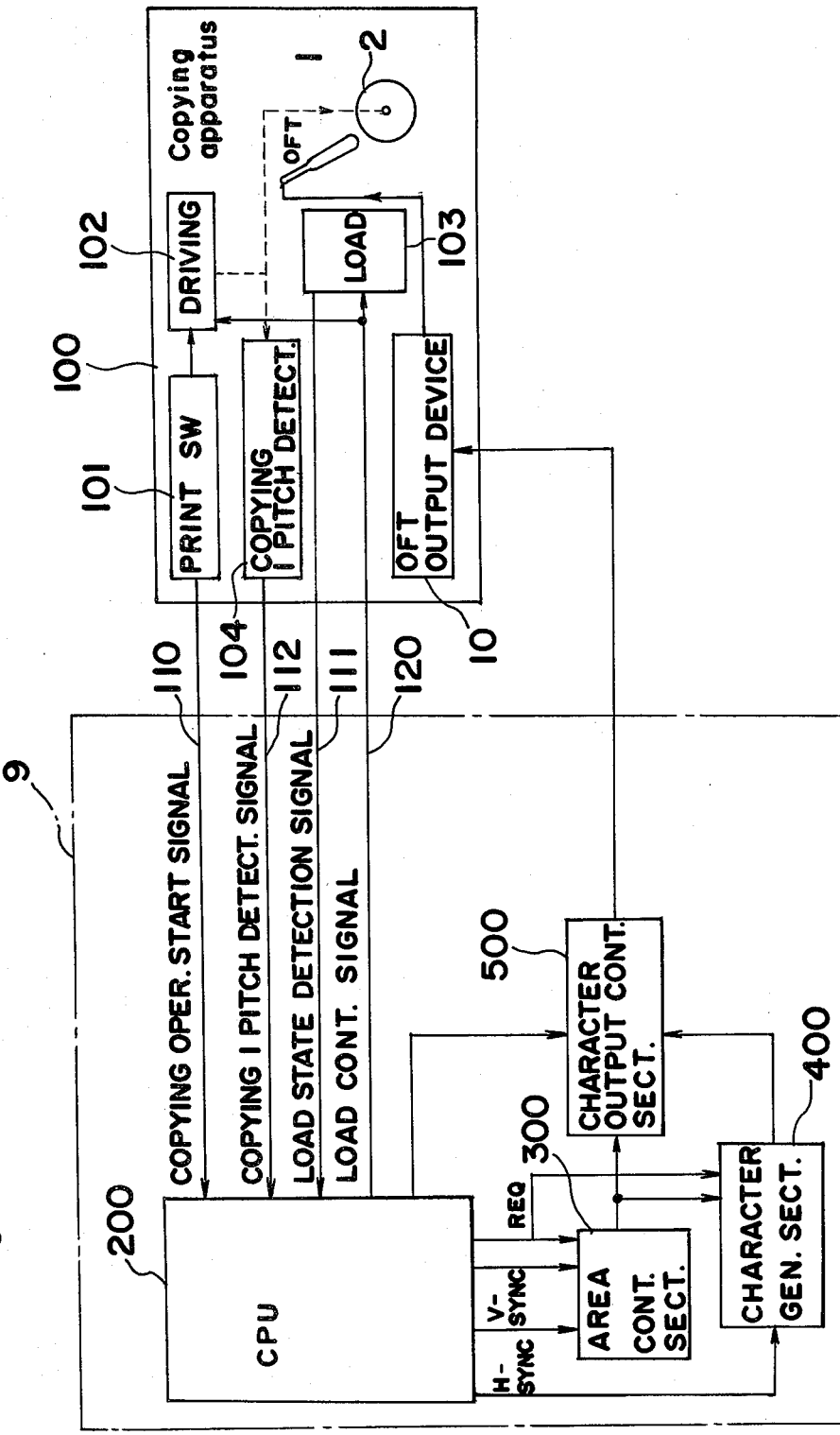
FIG. 2 is a block diagram showing the relation functional relationship between an image information output apparatus and a copying apparatus according to the present invention.

In a block diagram of FIG. 2 which shows the relationship between the control device 9 and the copying apparatus 100, the control device 9 further includes the area control section 300, a character generating section 400 and a character output control section 500, etc. which are coupled to a CPU (central processing unit) 200 as shown. The area control section 300 is intended to preliminarily select the area to which the image information is to be applied, and the character generating section 400 outputs the character information to the predetermined area selected by the area control section 300, while the character output control section 500 has the function of applying the character information produced in the predetermined area to the OFT output device 10. Meanwhile, in the copying apparatus 100 in which the mechanisms for electrophotographic copying are provided as mentioned earlier, there are further provided a print switch 101 for starting the copying operation which is connected to a driving device 102 for driving the photoreceptor drum 2 and copy paper transporting device, etc., and other load 103, all of which are coupled to the CPU 20 for supplying a copying operation starting signal 110 from the print switch 101, a load state detection signal 111 to said CPU 200. In addition, there is also provided a copying one pitch detecting means 104 which is coupled to the CPU 200 and produces one pitch detection signal 112 for the copying operation by detecting the functioning and the like of the driving device 102 for synchronizing of the functioning of the copying apparatus 100 and the output of the OFT 1, which is coupled to the character output control section 500 of the control unit 9 through the OFT output device 10.

From the CPU 200, control signals 120 for the load 103 and driving device 102 are output to correspond to the respective input signals for effecting ON/OFF control of the driving of the copying apparatus 100, the feeding control of the copy paper 8, and the functioning of the controls of the corona charger 3, the developing device 13, the transfer charger 4, the charge eraser 5, etc. It is to be noted that the load state detection signal 111 which is referred to above indicates, for example, the signal indicative of the temperature of the fixing device, the detection signal for the copy paper location, the detection signal for the copy paper jamming and the like, with sensors of such signals being provided within the copying apparatus 100. Furthermore, as functioning control signals for the area control section 300, an image plane synchronizing signal V-SYNC a, line synchronizing signal H-SYNC a, character requiring signal REQ, etc. are output from the CPU 200.

Figure 3:
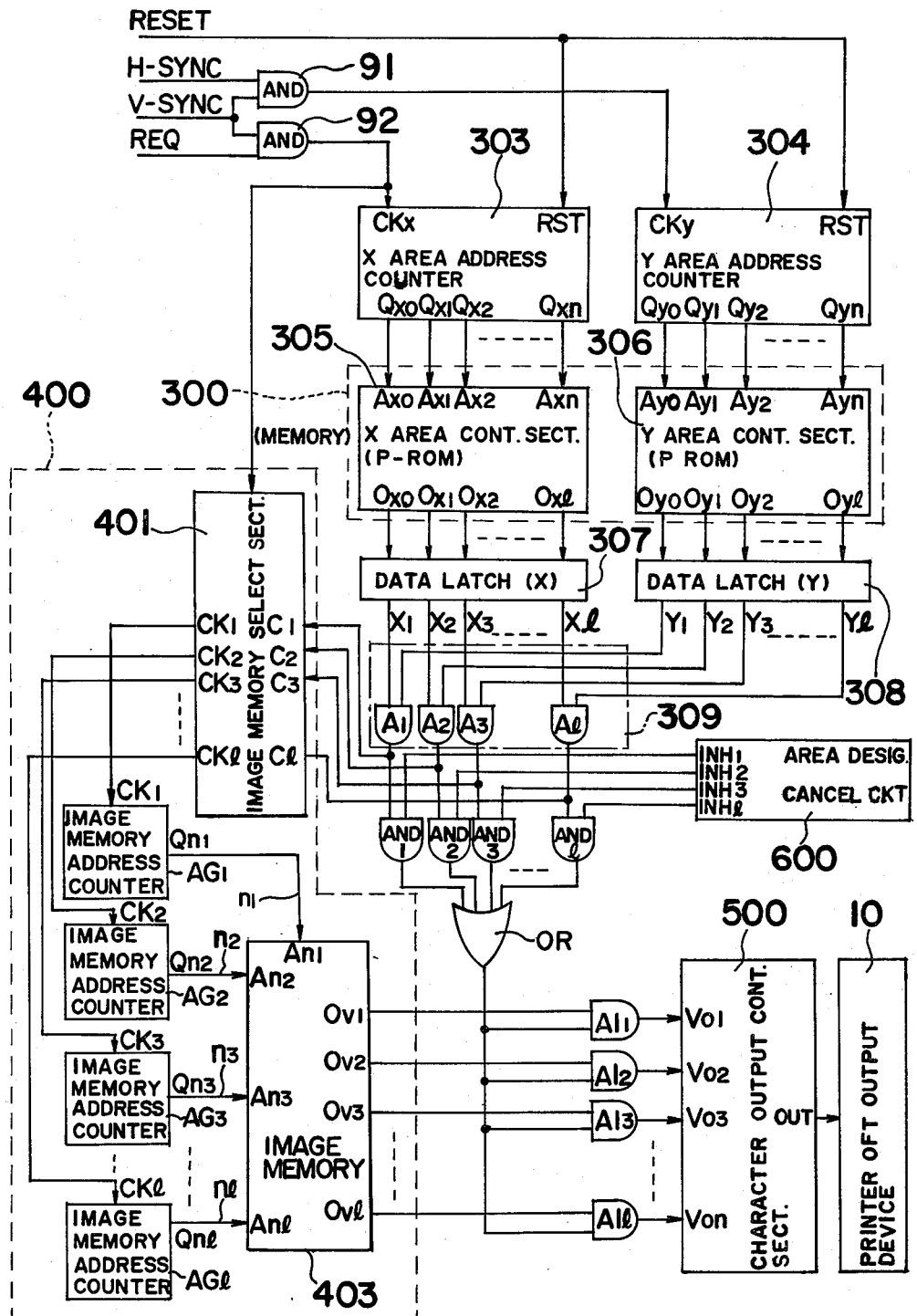
FIG. 3 is an electrical block diagram showing the specific arrangement of the image information output apparatus according to the present invention.
Figure 4:
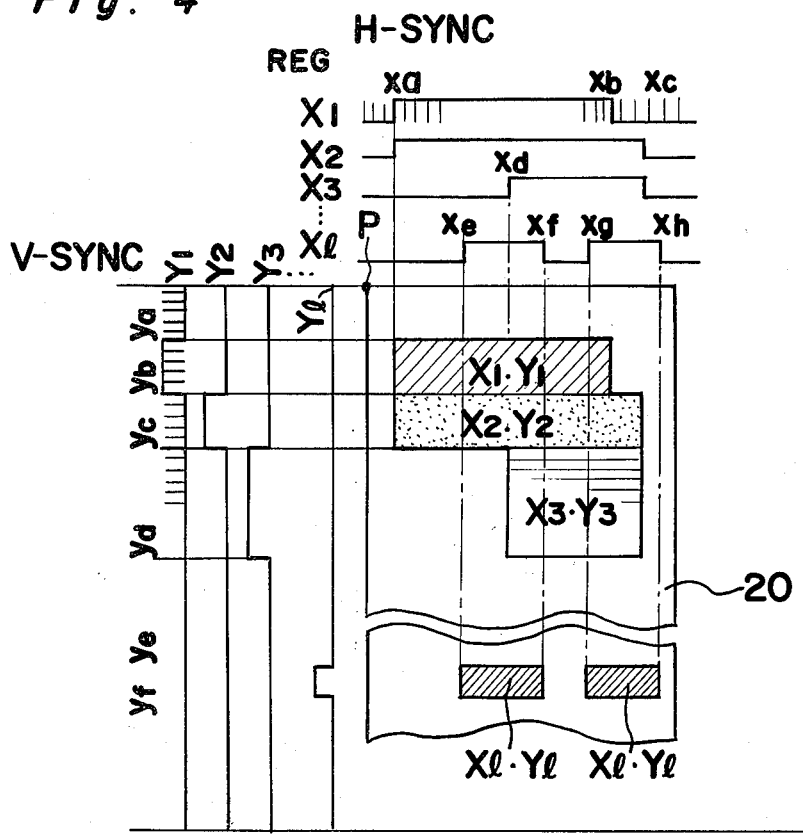
FIG. 4 is a diagram explanatory of the operation of the image information output apparatus of FIG. 3.

Referring particularly to FIGS. 3 and 4, the image information output apparatus according to the present invention will be described in detail hereinbelow.

Of the signals from the CPU 200, the image plane synchronizing signal V-SYNC is produced in synchronism with movement of a leading edge of a copying material, i.e. copy paper 8 or the like, and is applied to the input terminals of two-input AND gates 91 and 92 which are coupled to an X area address counter 303 and a Y area address counter 304 every time the signal 112 from the copying one pitch detecting means 104 mentioned earlier is supplied to the CPU 200. The line synchronizing signal H-SYNC is the synchronizing signal which is output once for each scanning of one line by the OFT 1 so as to be supplied to the AND gate 91, and the output of the AND gate 91 is counted by being supplied to the input terminal CKy of the Y area address counter 304. The character requiring signal REQ is the pulse signal for requiring image information for each unit length (image unit) in the X direction properly divided in the above one line, and is counted by being supplied to the input terminal CKx of the X area address counter 303. Upon counting to a predetermined number, the scanning of the subsequent line is started. An X area control section 305 and a Y area control section 306 (equivalent to the area control section 300 of FIG. 2) to which the X area address counter 303 and Y area address counter 304 are respectively coupled have independent functions, and each includes a programmable ROM (P-ROM i.e. programmable read only memory) for storing numerical data for opening and closing gates according to the number of counts which have been counted by the X and Y area address counters 303 and 304. Accordingly, the Y area control section 306 judges whether or not the line is one for which the image information is required or not per each count of the Y area address counter 304, and if "YES", produces a "1" level as the area signal with respect to said line, while the X area control section 305 judges, per each line, which count from the first of the REQ signal pulses in said line is equivalent to the area to which the image information is applied, and in the set number of counts, produces a "1" level as the area signal per each image unit. These area signals in the X and Y directions are respectively retained by data latch circuits 307 and 308 coupled to the X and Y area control sections 305 and 306.

It is to be noted here that the outputs of the X and Y area address counters 303 and 304 are successively produced from respective output terminals $Qx_0$, $Qx_1$, ... and $Qx_n$ and $Qy_0$, $Qy_1$, ... and $Qy_n$ respectively coupled to terminals $Ax_0$, $Ax_1$, ... and $Ax_n$, and $Ay_0$, $Ay_1$, ... and $Ay_n$ of the X and Y area control sections 305 and 306 so as to correspond to the number of the counts, and from addresses 0 to 1 corresponding to respective recording areas (for example, $(X_1,Y_1)$, $(X_2,Y_2)$, and $(X_l,Y_l)$ in FIG. 4) of the output terminals $Ox_0$, $Ox_1$, ... and $Ox_l$, and $Oy_0$, $Oy_1$, ... and $Oy_l$ of the X and Y area control sections 305 and 306, the "0" and "1" signals based on the above memory information are produced searially in a time sequence per each REQ signal so as to be latched by the data latches 307 and 308 for providing $X_1$, $X_2$, ... and $X_l$ and $Y_1$, $Y_2$, ... and $Y_l$ as outputs, the corresponding numbers of which are respectively applied to AND circuits $A_1$, $A_2$, ... and $A_l$ constituting an area signal producing section 309.

Still referring to FIGS. 3 and 4, the X area control section 305 and Y area control section 306 are each provided with memory portions corresponding in number to the number of areas to be designated, and according to the count values of the X and Y area address counters 303 and 304, an output of either a "0" level or a "1" is produced in a parallel relationship from the respective memory portions through the output ports $Ox_0$, $Ox_1$, ... and $Ox_l$ and $Oy_0$, $Oy_1$, ... and $Oy_l$ and thus, outputs $X_1$, $X_2$, ... and $X_l$ and $Y_1$, $Y_2$, ... and $Y_l$ are obtained via the data latches 307 and 308. More specifically, although the outputs $X_1$, $X_2$, ... and $X_l$ of the data latch 307 in the X direction are produced for the respective lines in a parallel relationship in the form as shown in FIG. 4 according to the count values of the REQ signal pulses, the respectively corresponding outputs $Y_1$, $Y_2$, ... and $Y_l$ in the Y direction are also in the form as shown in FIG. 4, and the recording areas $X_1Y_1$, $X_2Y_2$, ... and $X_lY_l$ are set by ANDing the outputs in the X and Y directions per each of the REQ signals, with outputs of the AND circuits $A_1$, $A_2$, ... and $A_l$ being set as concurrence by a image unit of "1" level, and therefore, after all, only the portions represented by $X_1Y_1$, $X_2Y_2$, ... and $X_lY_l$ in FIG. 4 are to be designated as the output areas of the image. The outputs of the AND circuits $A_1$, $A_2$, ... and $A_l$ are further supplied to one input terminal of each of AND circuits $AND_1$, $AND_2$, ... and $AND_l$ in the subsequent stage, and also to corresponding terminals $C_1$, $C_2$, ... and $C_l$ of an image memory selecting section 401 in the character generating section 400. The image memory selecting section 401 is arranged to select the addresses of the AND circuits $A_1$, $A_2$, ... and $A_l$ of the output "1", i.e. images corresponding to the respective selected areas, and the image information is stored in an image memory 403 coupled to the image memory selecting section 401 through image memory address counters $AG_1$, $AG_2$, ... and $AG_l$ whose output terminals $Qn_1$, $Qn_2$, ... and $Qn_l$ are connected to corresponding terminals $An_1$, $An_2$, ... and $An_l$ of the image memory 403 through lines $n_1$, $n_2$, ... and $n_l$ as shown. The image memory selecting section 401 produces the output "1", at a timing corresponding to the REQ signals, from one of the output terminals $CK_1$, $CK_2$, and $CK_l$ according to the input from the AND circuits $A_1$, $A_2$, ... and $A_l$, to thereby selectively actuate one of the image memory address counters $AG_1$, $AG_2$, ... and $AG_l$ corresponding to the predetermined image memory so as to output the image information corresponding thereto from the image memory 403. Therefore, the image information corresponding to the AND circuit which produces a "1" level from the AND circuits $A_1$, $A_2$, ... and $A_l$ is output from one of the predetermined output terminals $Ov_1$, $Ov_2$, ... and $Ov_l$ per one REQ signal. Needless to say, this image information output is produced corresponding to one image unit of the selected recording area in a of 1:1 relationship.

It is to be noted here that the image information in the image memory 403 is stored by binary signal of a "0" or "1" level for each image unit, and that, since the method or device itself for displaying patterns of characters and figures on an image plane which is decomposed into the form of matrix through the combination of "0" and "1" levels is conventional, a detailed description thereof is abbreviated here for brevity.

It should also be noted that the present invention is particularly characterized in that, as a conditional signal of the output per each image unit of the image memory, the outputs of the AND circuits $A_1$, $A_2$, ... and $A_l$ which produce a "1" level when the area signal in the X and Y directions becomes a "1" level are utilized.

On the other hand, in FIG. 3, there is also provided an area designation cancel circuit 600 which is coupled to the AND circuits $AND_1$, $AND_2$, ... and $AND_l$ for effecting partial correction or cancelling of the designation of the arbitrary area with respect to the recording area data stored in the P-ROM (programmable read only memory) of the area control sections 305 and 306 described earlier. More specifically, although the memory contents of the P-ROM of the area control sections 305 and 306 may be altered through proper operation, such alterations can not be readily effected by any person, but requires expert knowledge and techniques. Therefore, it is extremely difficult for an ordinary user to alter the recording area once designated. In connection with the above, however, in many of the reproductions or copied items to be prepared, there are cases where whole one section or a certain portion of one section is not required to be copied. The area designation cancel circuit 600 is very useful in such cases. Output terminals $INH_1$, $INH_2$, ... and $INH_l$ of the area designation cancel circuit 600 normally produce a "1" level when no portion of the designated area is to be cancelled, and are connected to the other input terminals of the AND circuits $AND_1$, $AND_2$, ... and $AND_l$. Accordingly, in cases where no portion of the designated area is to be cancelled, the outputs of the AND circuits $A_1$, $A_2$, ... and $A_l$ become the outputs of the AND circuits $AND_1$, $AND_2$, ... and $AND_l$ as they are. Meanwhile, for cencelling the designation of the specific area, when operation is effected to render a level "0", the outputs of the output terminals $INH_1$, $INH_2$, ... and $INH_l$ corresponding to the area to be cancelled, the outputs of the corresponding AND circuits $AND_1$, $AND_2$, ... and $AND_l$ a become "0" level, even if the outputs of the AND circuits $A_1$, $A_2$, ... and $A_l$ are a "1" level, and thus, the output of the image memory 403 at the portion is obstructed at the portion of the AND circuits $A_1$, $A_2$, ... and $A_l$, without the formation of the image. To the image memory address counters $AG_1$, $AG_2$, ... and $AG_l$ of the character generating section 400, and area signal of the area signal producing section 309 and the signal from the AND gate 92 are applied through the image memory selecting section 401, and only during input of the pulses indicating the portion selected for the area, does the address counter corresponding to the selected area count up. On the other hand, to the image memory address counters $AG_1$, $AG_2$, ... and $AG_l$, instruction signals from the CPU 200 are applied for producing outputs to the image memory section 403 in a unit, for example, of 16 bits, whereby the image information accessed or called out from the image memory section 403 is applied to corresponding terminals $Vo_1$, $Vo_2$, ... and $Vo_n$ of a character output control section 500 through AND circuits $Al_1$, $Al_2$, ... and $Al_l$, for example, in a unit of one byte by the instruction of the CPU 200. AND signals of the output from the image memory 403 and output of an OR circuit OR are applied to the character output control section 500, where serial data is converted, for example, into parallel signal of 8 bits to be applied to the OFT output device 10.

Referring particularly to FIG. 4, the functioning of the image information output apparatus of FIG. 3 will be described with reference to the case where the character information is applied to the predetermined areas $X_1Y_1$, $X_2Y_2$, ... and $X_lY_l$ of a recording medium 20. It is to be noted that the recording medium 20 referred to above is equivalent, for example, to the photoreceptor surface 2a of the photoreceptor drum 2 of FIG. 1, and consequently a reversed image of the image on the recording medium 20 is to be transferred onto the copy paper sheet 8 (FIG. 1), while the Y direction in FIG. 4 indicates the direction opposite to that of the movement of the photoreceptor drum 2. It should also be noted that if a stylus electrode or the like is employed as an output device, electrostatic recording paper, etc. may be used for the recording medium 20.

In FIG. 4, at a point corresponding to a point P of the recording medium 20, the synchronizing signal 112 from the one pitch detecting device 104 of the copying apparatus 100 is output, and the image plane synchronizing signal V-SYNC is applied to the area control circuit 300 through the CPU 200. In the above case, both of the area address counters 303 and 304 are cleared by RESET signals. After the application of the image plane synchronizing signal V-SYNC, the line synchronizing signal H-SYNC is output, and at the time that the Y area address counter 304 starts counting, the character requiring signal REQ is output, and the X area address counter 303 starts counting.

On the assumption that, for example, the image information is constituted by information of n bytes, the X area address counter 303 is advanced to the subsequent line upon the counting of n units of REQ signals, and the Y area address counter 304 counts up a "1" level.

In the X area control section 305 and Y area control section 306, corresponding to the count number of the above X and Y area address counters 303 and 304, X direction area signal pulses and Y direction area signal pulses are respectively produced. More specifically, in the example of FIG. 4, when the Y area address counter 304 comes to have a numerical value ya, the output of the Y area control section 306 becomes a "1" level, and in this case, during the count numbers xa to xb for the X area address counter 303, the output of the X area control section 305 becomes a "1" level every time the REQ signal is produced, and area signal pulses are output from the area signal producing section 309 through the latch circuits 307 and 308 for outputting the information of the predetermined address.

In the functioning as described above, the data of the image memory address counter AG1 is successively counted up every time the REQ signal is generated until such time as the recording area $X_1Y_1$, i.e. the Y area counter 304 exceeds the numerical value yb, with the repetition of the functioning in the similar manner as described above, during which period, the predetermined character information is output from the OFT 1. Similarly, in the recording area $X_2Y_2$, other character information is output by the outputs of the area signal producing section 309 at the time when the Y area address counter 304 is between the numerical values $yb+1$ to yc and the X area address counter 303 is between the numerical values xa to xc, while in the recording area $X_3Y_3$, other character information is further produced by the outputs of the area signal producing section 309 at the time when the count numbers of the Y area address counter 304 are $yc+1$ to yd and those of the X area address counter 303 are xd to xc.

It is to be noted that in the foregoing arrangement, a memory element preliminarily which stores predetermined characters or patterns of figures may be employed for the image memory 403, but that it may be so arranged that by reading the image of an original with the use of a suitable line sensor or the like, such an image may be stored in a predetermined address of the memory element in the form of a binary signal.

Figure 5:
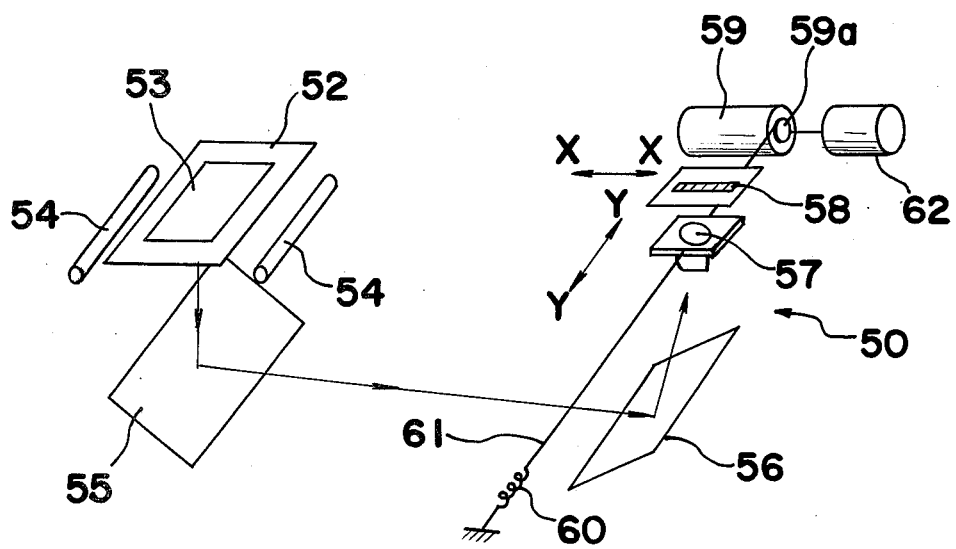
FIG. 5 is a schematic perspective view showing the general construction of an image reading device which may be applied to the image information output apparatus of the present invention.

Referring also to FIG. 5, one example of an image reading device of the above described type will be described hereinbelow.

In FIG. 5 showing a main portion of the specific construction of the image reading device applied with the present invention, the image reading device 50 generally includes an original platform 52 made of a transparent material such as glass or the like for placing an original 53 to be copied thereon, original illuminating lamps 54 are disposed below and adjacent to the platform 52, and reflecting mirrors 55 and 56 are so disposed as to direct the light-wise image of the original 53 to a line sensor 58 of CCD image sensor through a scanning lens 57.

The light-wise image of the original 53 placed on the platform 52 and illuminated by the lamps 54 is reflected by the reflecting mirrors 55 and 56 and projected onto the line sensors 58 via the scanning lens 57.

Figure 6:
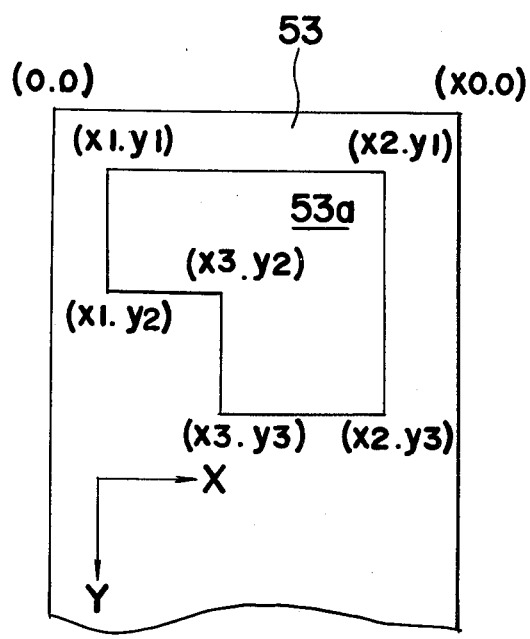
FIG. 6 is a schematic digram explanatory of one example of the state of an original to be used for the arrangement of FIG. 5.
Figure 7:
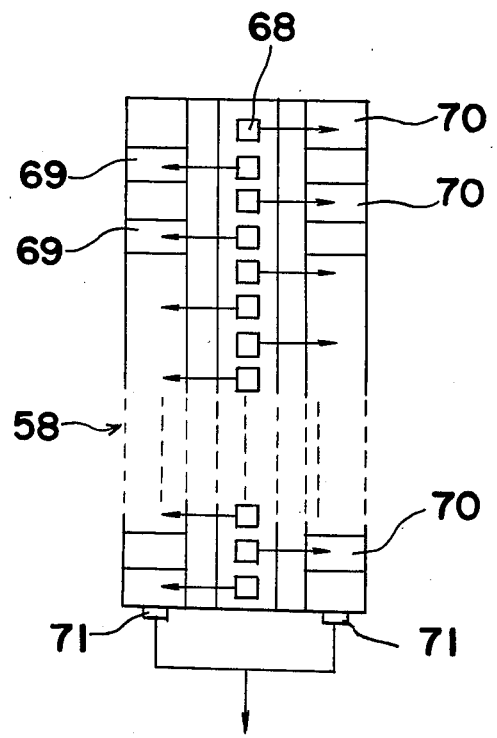
FIG. 7 is a schematic top plan view showing the structure of a line sensor employing in the arrangement of FIG. 5.

The line sensor 58 is arranged and held in the X direction (main scanning direction) with respect to the X and Y directions of the original 53, for example, as shown in FIG. 6, and capable of scanning the entire surface of the original 53 through the movement (sub-scanning) of the scanning lens 57 in the Y direction. The scanning lens 57 is arranged to be movable in the Y direction as mentioned above through a wire 61 which as one end wound end onto a pulley 59a secured to a rotary shaft of a motor 59, and connected at its other end to one end of a spring 60 suitably secured to a frame (not shown) of the device 50 at the other end thereof, so as to read the output from each bit of the line sensor 58 through suitable synchronizing signals by obtaining lens position signal upon the detection of the rotation of the motor 59 with an encoder 62. Meanwhile, the line sensor 58 is provided with a photosensor array 68 of many bits (normally over 1000 bits) arranged in a row and shift registers 69 and 70 for storing photoelectric outputs of the respective photosensors as shown in FIG. 7, and is arranged to successively read out the signals of the respective photosensors 68 from the output terminals 71 by means of clock pulses. Since the line sensor of the above described type is conventional, a detailed description thereof is abbreviated here for brevity.

Figure 8:
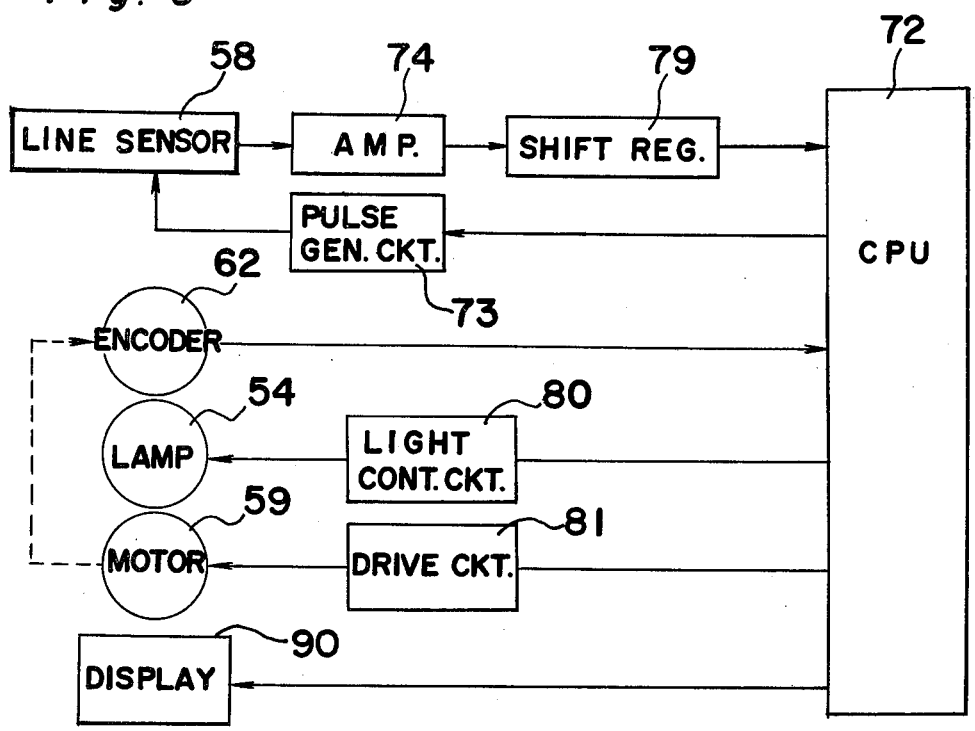
FIG. 8 is a block diagram showing the general construction of a control circuit for reading output signals from the line sensor and also for controlling the motor, etc. in the arrangement of FIG. 5.

Referring also to FIG. 8 which shows a block diagram of a control circuit which reads the output signal from the above described line sensor 58, and which also controls a motor 59, etc., the line sensor 58 is coupled to a CPU (central processing unit) 72 through an amplifier 74 and a shift register 79, with the CPU 72 being further connected to the line sensor 58 through a pulse generator circuit 73; the encoder 62 is coupled to said CPU 72, which is also coupled to the lamps 54 through a light control circuit 80, and to the motor 59 through a drive circuit 81, and also directly coupled to a display device 90 as shown.

By the above arrangement, the output of the line sensor 58 is applied to the CPU 72, having a memory portion, through the amplifier 74 and shift register 79; the output of the encoder 62 is applied to the CPU 72 as the lens position information, on the basis of which read instruction signal for each line is output from the CPU 72 to the line sensor 58. The read instruction signal is applied to the clock pulse generating circuit 73, and the clock pulses produced therefrom are fed to the line sensor 58, whereby analog signals representing black and white levels of respective points of the original image are successively read out from the shift registers 69 and 70 of the line sensor 58 so as to be formed into regularized binary signals after being subjected to output amplification by the amplifier 74.

The output of the amplifier 74 is stored in the shift register 79 for being converted into parallel information and is written in the memory section (image memory) through the CPU 72. The information thus written-in is converted into a video signal within the CPU 72 by suitable means (not shown), and is fed to the display device 90, for example, of a CRT (cathode ray tube), etc. for a display of the read image, if required. The original illumination lamps 54 and lens driving motor 59 are respectively controlled by the instruction signals from the CPU 72 through the light control circuit 80 and the driving circuit 81.

Based on the arrangement as described in the foregoing, description will be given hereinbelow on the image reading device which is arranged to limit the memory capacity of the memory means to a necessary minimum, for example, by reading the information within the predetermined reading area 53a of the original 53 as shown in FIG. 6. The reading device as referred to above is particularly effective when applied to an output apparatus so arranged that, in the case where, for example, the original 53 in FIG. 6 has common items printed in its portion other than the reading area 53 for writing changeable information within the reading area 53a, only such changeable information is read off for display or printing, and in the above case, since it is not necessary to provide the capacity necessary to store the information contained over the entire surface of the original 53, a memory means of small capacity may be utilized in an extremely efficient manner. It is to be noted here that the predetermined reading area may be readily altered by re-writing or exchanging the reading area information of the predetermined memory means as will be described later.

Figure 9:
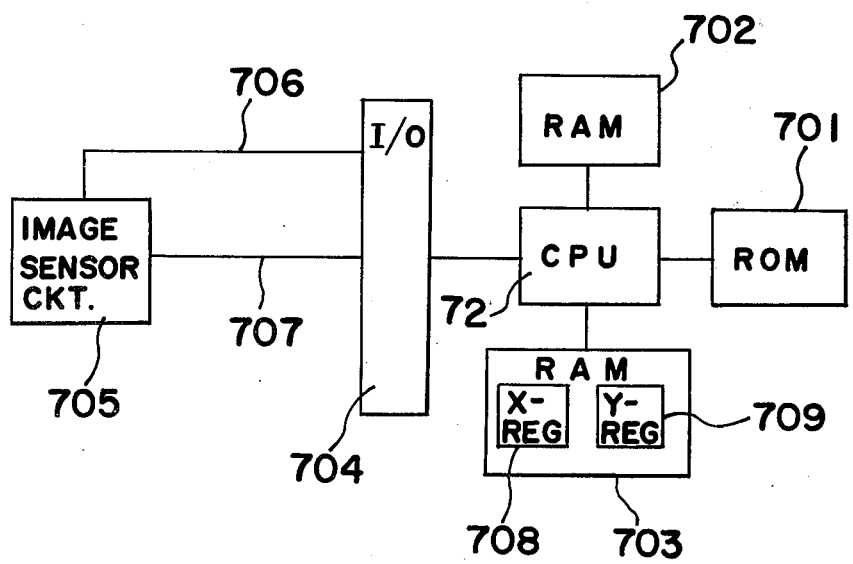
FIG. 9 is an electrical block diagram showing the circuit arrangement of an image reading device according to the present invention.
Figure 10:
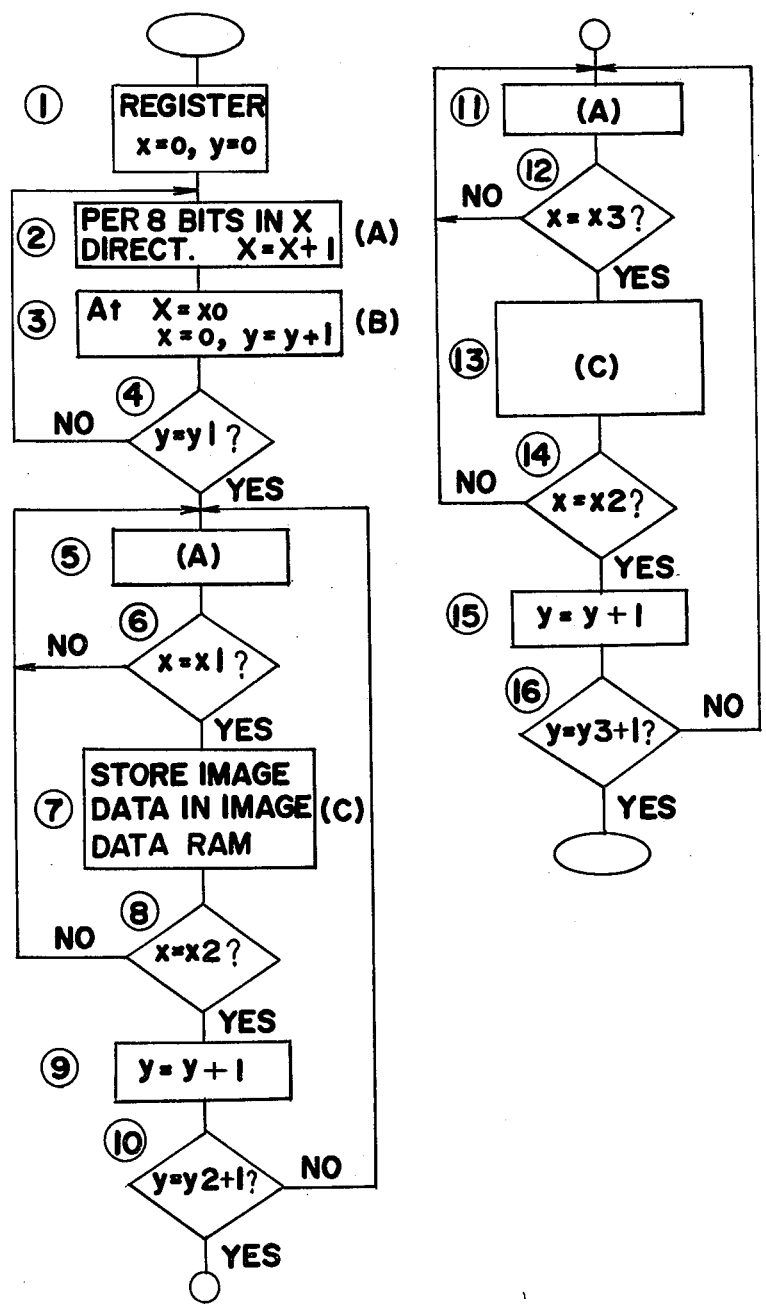
FIG. 10 is a flow chart explanatory of the functioning of the image reading device of FIG. 9.

Reference is made to FIG. 9 showing a schematic block diagram of the reading device according to the present invention, and also to FIG. 10 illustrating a flow chart which is explanatory of the functionings thereof.

In FIG. 9, to the CPU 72 similar to that described with reference to FIG. 8, a read only memory 701 (referred to as a ROM hereinbelow) in which data such as programs, etc. are stored, a random access memory 702 (referred to as a RAM hereinbelow) for reading in the data, a RAM 703 for the both X and Y direction counters, an input and output interface 704 (referred to as I/O hereinbelow), etc. are respectively connected through corresponding bus lines, while, to the I/O 704, there are connected an output line 706 of the functioning instruction signal for an image sensor circuit 705 including the line sensor 58, amplifier 74, shift register 79, etc. mentioned earlier, and an input line 707 of the read off image data. Meanwhile, in the RAM 703 for the above counter, there are further included an X direction register 708 and a Y direction register 709.

The functionings of the image reading device having the construction as above will be described hereinbelow for the case where the area 53a of the original 53 in FIG. 6 is to be read, with reference to the flow chart of FIG. 10.

It should be noted here that in FIG. 6, symbols $x_1$, $x_2$, ... and $x_n$ and $y_1$, $y_2$, ... and $y_n$ respectively represent coordinate positions in the unit of read off image in the X and Y directions.

It should also be noted that in the above arrangement, the output from the image sensor circuit 705 is produced in the form of 8 bits parallel signal and consequently, the X register 708 is set to count up for every 8 bits, while the Y register 709 is programmed to count up every time the count number of the X register 708 becomes $x=x_0=$[byte number for one line].

In FIG. 10, by means of a suitable image reading start signal, the scan motor 59 as described with reference to FIGS. 5 and 8 is first driven, and when the original placing datum position O,O is detected by the encoder or by specific marks, etc. on the original platform 52, the contents of the respective X and Y registers 708 and 709 are cleared in the step ①, and simultaneously, the functioning signal is applied from the CPU 72 to the image sensor circuit 705 through the line 706 so as to input the image data through the line 707.

In the step ②, with the points O,O set as original points of the coordinate, the image data signal being applied as an input is counted by the X register 708 for effecting the operation represented by $x=x+1$ for each 8 bits in the X direction.

Subsequently, in the step ③, when the contents of the X register 708 become $x=x_0$, the contents of the Y register 709 are counted up through operation represented by $y=y+1$, while the Y register 708 is cleared for being ready for reading of the subsequent line, which is started by the synchronizing signal from the encoder 62 mentioned earlier, with a repetition of the above function occurring thereafter.

In the step ④, it is judged whether or not the line of the set reading area 53a of the original 53 is reached, and upon arrival at $y=y_1$, the step is advanced to the subsequent step ⑤, in which, counting in the X direction is effected in the similar manner as in the step ② mentioned earlier, but in this case, since storing of the image signal into the RAM 702 is effected during the interval between $(x=x_1)$ and $(x=x_2)$ in the line $(y=y_1)$, when $(x=x_1)$ is judged in the step ⑥, the input image data is transferred to the RAM 702 at each count of the X register 708 in the step ⑦, with the above functioning being repeated until $(x=x_2)$ is judged at the step ⑧.

In the steps ⑨ and ⑩, it is shown that the functionings from the step ⑤ to the step ⑧ are repeated from the line $(y=y_1)$ to the line $(y=y_2)$, and upon arrival at $(y=y_2+1)$, the step is advanced to the subsequent step ⑪.

In the step ⑪, although the counting in the X direction is effected in the similar manner as in the above steps ② and ⑤, since storing of the image signal in the RAM 702 is effected during the interval between $(x=x_3)$ and $(x=x_2)$ in the line $(y=y_2+1)$, $(x=x_3)$ is judged at the step ⑫, and until $(x=x_2)$ is judged at the step ⑭, transfer of the image data to the RAM 702 is effected at each count of the X register 708 in the step ⑬ in the similar manner as in the step ⑦. In the subsequent steps ⑮ and ⑯, it is shown that the above functionings are repeated from $(y=y_2+1)$ to $(y=y_3)$.

As is clear from the foregoing description of the functionings, in the image reading device 50, only the image data within the predetermined reading area 53a are stored in the memory means, with the data for the other portions being cut off. Accordingly, the capacity of the RAM 702 can be markedly reduced as compared with that of a RAM for storing the data over the entire surface of the original 53, and thus, the arrangement is not only advantageous costwise, but may be extremely simplified in the processing of storing data, since only the necessary minimum data is stored.

It is to be noted here that, in the arrangement as described in the foregoing, although the data of the coordinate positions for setting the reading area preliminarily worked out as numerical data based on the size of the picture elements, have only to be stored in the ROM 701, it is possible to replace the ROM 701 with a programmable ROM (P-ROM) for altering the range of the reading area 53a by properly re-writing the numerical data or it may be so modified as to employ other numerical data input means and RAM for setting the area.

It should also be noted that, although in the foregoing embodiment, there is described the image reading device employing the line sensor in which the photosensors are arranged in the one dimensional direction, the line sensor may be modified so as to have image sensors arranged in a two dimensional planar configuration to achieve the similar effects.

Another point to be noted in the foregoing embodiment is that, while the image data stored in the RAM 702 is properly converted into video signals as described in the foregoing so as to be displayed by the CRT display device 90 or to provide hard copies through a printing device in which the OFT device and electrophotographic copying apparatus, etc. are combined, since the image signals (mainly binary signals indicating white and black) stored in the RAM are in the form of information of white or black obtained by decomposition of characters or figures of the original into picture elements of suitable size, there may be a case where white and black patterns which are unsuitable for actual characters or figures are displayed, if such video signals are output as they are for indication. The inconvenience as described above results from the difference in sensitivity of the respective photosensors of the line sensor 58 or the difficulty in the judgement of white and black with respect to inputs having intermediate values, and tends to take place at the boundary of the white and black regions. Accordingly, if it is so arranged that the information stored in the RAM 702 is once displayed on the CRT display device for altering the memory contents of the RAM 702 by correcting the wrong white and black patterns, for example, with the use of a light pen, correct patterns of the characters and figures can be obtained even when the information is made into hard copies.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. An image information output apparatus which is arranged to display patterns of characters and figures as a whole by dividing an image forming plane defined in an X direction and a Y direction into an X-Y matrix configuration having predetermined image units and to generate binary image signals which are used for image formation, each of said image signals respectively corresponding to one of said image units, said image information output apparatus comprising:

a first setting means for setting conditions for a binary "0" or a binary "1" with respect to each of said image units, said first setting means traversing said image forming plane in said X direction;

a second setting means for setting conditions for a binary "0" or a binary "1" with respect to each of said image units, said second setting means traversing said image forming plane in said Y direction;

a means for continuously generating output timing signals in a main scanning direction which corresponds to said X direction;

an AND means operatively connected to said first and second means and said means for generating output timing signals for calculating the logical AND product of two signals set by said first and second setting means so as to output a signal at every generation of said output timing signal;

a means for storing image signals; and a means operatively connected to said means for storing image signals for outputting said stored image signals, one image unit by one image unit, every time said output signal of said AND means becomes equal to a binary "1".

2. An image information output apparatus as claimed in claim 1, further comprising:

an X area address counter for counting said output timeing signals;

a Y area address counter arranged to count up every time said X area address counter finishes counting the number of divisions in said X direction; and a means for controlling an area which is located in said first and second setting means and in which numerical value data is preliminarily stored in that said first and second setting means output conditional signals of either a binary "0" or "1" according to said numerical value data at every count value by receiving count values from said X area address counter and Y area address counter.

3. An optical image reading apparatus which is arranged to store in a storing means, predetermined image signals which are obtained through decomposition on a line by line basis of an original image on an original image surface by a line sensor employing a solid state image pickup element, said optical image reading apparatus comprising a means for designating positions of a predetermined area on said original image surface, a means for associating an output of said line sensor with said designated positions of said predetermined area, and a means for successively transferring respective outputs of said line sensor which correspond to designated positions of said predetermined area into said storing means on a line by line basis;

wherein said area position designating means is arranged to designate said positions on said original image surface with respect to a two dimensional X-Y coordinate system having its origin point at a predetermined position on said original image surface, and wherein a picture element of said original image corresponds to one unit of a predetermined area.

4. An optical image reading apparatus which is arranged to store in a storing means, predetermined image signals which are obtained through decomposition on a line by line basis of an original image on an original image surface by a line sensor employing a solid state image pickup element, said optical image reading apparatus comprising a means for designating positions of a predetermined area on said original image surface, a means for associating an output of said line sensor with said designated positions of said predetermined area, and a means for successively transferring respective outputs of said line sensor which correspond to designated positions of said predetermined area into said storing means on a line by line basis;

wherein said associating means includes a Y area address counter which counts up for each of said lines, an X area address counter which counts a predetermined image unit for each of said lines, a means for judging whether a count stored in said Y area address counter corresponds to a first designated numerical value, and a means for judging whether a count stored in said X area address counter corresponds to a second designated numerical value when said count stored in said Y area address counter corresponds to said first designated numerical value.

5. An optical image reading apparatus as claimed in claim 4, wherein said area position designating means comprises a program storing device of a micro-computer in which said positions on said original image surface which respectively correspond to positions on a two dimensional X-Y coordinate system are preliminarily stored as numerical data values.

* * * * *

UNITED STATES PATENT AND TRADEMARK OFFICE
CERTIFICATE OF CORRECTION

PATENT NO. : 4,434,503

DATED : February 28, 1984

INVENTOR(S) : Atsuyuki Tanaka, Hiroaki Kojima, Shozo Kaieda, Tokuji Kakiuchi, Nobuaki Nishioka, Yukio Tadauchi and Hidekazu Nakagami It is certified that error appears in the above—identified patent and that said Letters Patent is hereby corrected as shown below:

In the Heading, under section

"[30] Foreign Application Priority Data"

the information should read as follows:

--Jul. 31, 1979 [JP]  Japan...................54-98005
  Sep.  6, 1979 [JP]  Japan...................54-114775--.

Signed and Sealed this

Twelfth Day of June 1984

[SEAL]

Attest:

GERALD J. MOSSINGHOFF

Attesting Officer    Commissioner of Patents and Trademarks